United States Patent [19]

Schaller

[11] Patent Number: 4,500,048

[45] Date of Patent: Feb. 19, 1985

[54] CENTRIFUGAL BRAKE DEVICE, ESPECIALLY FOR THE AUTOMATIC WINDING OF AN ELECTRICAL CABLE

[76] Inventor: Albert R. Schaller, Rilkeweg 1, 7573 Sinzheim, Fed. Rep. of Germany

[21] Appl. No.: 394,911
[22] PCT Filed: Jan. 2, 1981
[86] PCT No.: PCT/DE81/00003
    § 371 Date: Jun. 23, 1982
    § 102(e) Date: Jun. 23, 1982
[87] PCT Pub. No.: WO82/01624
    PCT Pub. Date: May 13, 1982

[30] Foreign Application Priority Data

Oct. 24, 1980 [DE] Fed. Rep. of Germany ....... 3040143

[51] Int. Cl.³ .................... B65H 75/48; F10D 59/00
[52] U.S. Cl. ................................. 242/107.3; 188/184
[58] Field of Search ................... 242/107.3; 188/184, 188/185

[56] References Cited

U.S. PATENT DOCUMENTS

| | | | |
|---|---|---|---|
| 2,761,650 | 9/1956 | Faugier | 242/107.3 |
| 2,959,371 | 11/1960 | Melton | 242/107.3 |
| 4,270,708 | 6/1981 | Vonk | 242/107.3 |

FOREIGN PATENT DOCUMENTS

| | | | |
|---|---|---|---|
| 1252266 | 10/1967 | Fed. Rep. of Germany | 188/184 |
| 39583 | 1/1921 | Norway | 188/184 |
| 78314 | 11/1918 | Switzerland | 188/184 |

Primary Examiner—Stuart S. Levy
Assistant Examiner—Thomas R. Hannon
Attorney, Agent, or Firm—Andrus, Sceales, Starke & Sawall

[57] ABSTRACT

In a device with a centrifugal brake, in particular for the automatic winding up of an electrical cable for an electrically driven apparatus on a rotatable drum, that is journalled with its hub on a pivot spindle standing on a base plate and is braked on the base plate, the centrifugal brake is formed as a brake wheel (5) revolving inside a brake collar (6) and supported on a journal pin (4) on the base plate (1) laterally of the pivot spindle (2), the brake wheel being driven from the drum with a high gearing ratio. Preferably, the brake wheel (5) possesses two centrifugal weight segments (12) that are connected through resilient flexible arms (5.3) with its hub as a single piece. Advantageously, the pivot spindle (2) for the drum (3) as well as the journal pin (4) for the brake wheel (5) and the brake collar (6) form a unitary injection molded part (FIG. 1, 2) with the base plate (1).

9 Claims, 6 Drawing Figures

CENTRIFUGAL BRAKE DEVICE, ESPECIALLY FOR THE AUTOMATIC WINDING OF AN ELECTRICAL CABLE

The invention relates to a device with a centrifugal brake, in particular for the automatic winding up of an electrical cable for an electrically driven apparatus on a rotatable drum, that is supported with its hub on a pivot spindle standing on a base plate and is braked on the base plate.

Winding up apparatuses of this type (cable drums) serve for the storage of electrical cables, that are only required occasionally and/or in varying length. In most instances of application, one attempts to hold the space requirements for the device as small as possible, particularly if it should be incorporated in electrical apparatus of all types for the household, for example, vacuum cleaners, kitchen appliances, and the like.

The diameter of the drum required for the application determines the minimum space requirements of the device in the rotational plane of the drum. If now the centrifugal weights, are mounted, as is customary, in pockets on the edge of one of the two drum flanges, the base plate must form with a collar overlapping these flanges, the sliding surface for these centrifugal weights (as for example DE-OS No. 2,756,023). This so simply appearing construction has considerable disadvantages: the centrifugal weights have a distinct weight. The base plate with collar increases unnecessarily the dimensions and with the customary embodiment involves, as an injection molded plastic part, an unnecessarily large and thus expensive injection molding. Further it is proportionately labor intensive, as the loose weights must be inserted by hand in the pockets and during the assembly easily drop out of the drum.

As an accessory for electrical apparatus in daily use such convenience serving wind up apparatus must, however, be as inexpensive as possible. This requires a construction for as simple as possible a configuration and fabrication technique.

The invention has as its object to find a centrifugal brake for economical winding up devices of the described type that requires no additional area or space, is simple to manufacture and permits a partial or fully automated assembly of the apparatus parts.

This object is achieved according to the invention under departure from the customary conception of as large as possible movement circle for the braking weights, in the manner that the centrifugal brake is formed as a brake wheel revolving inside a brake collar and supported on a journal pin on the base plate laterally of the pivot spindle, the brake wheel being driven with a high gear ratio from the drum. This gear ratio can, according to the arrangement and dimensions, be selected in the particular between 1:5 and 1:10. The force connection between the drum and braking wheel can be formed as a friction wheel or as a gear drive. In the first instance, the hub of the braking wheel stands in engagement with the hub of the drum or a friction ring on the drum flange, in the latter case as a pinion with a ring gear on the hub or flange. One obtains the largest possible gear ratio if the journal pin of the braking wheel is arranged inside of the friction ring or the ring gear.

As the centrifugal force of a mass proportional to the expression:

$$r \cdot \omega$$

whereby r is the radius and $\omega$ is the angular speed of the rotary movement, the arrangement according to the invention, in reference to advantageous material expenditure and costs, delivers a high braking moment with a small friction wheel, that increases with the square of the gear ratio and is proportional to the drum rotational speed. From this an optimal ratio between the gear ratio and centrifugal weights to be selected can be determined.

Preferably the brake wheel has two centrifugal weight segments that are connected through resiliently deflectable webs with its hub as a unitary element and are frictionally applied under the centrifugal force against the brake collar on the base plate.

Without a free running drive, that is ruled out on the basis of cost, the centrifugal force brake of a cable drum both acts in the unwind as well as the windup direction of the cable. Here the embodiment of the brake wheel with resiliently connected centrifugal weights exhibits a particularly advantageous characteristic, with respect to brakes with loose centrifugal weights, insofar as the braking moment in one rotary direction is noticably smaller than in the other rotary direction, namely in that rotary direction, with which the centrifugal weights so to speak "drag along" or "trail". In the opposite direction a positive compression of the attachment increases the pressing force of the weight and thus increases the braking moment. For a cable drum, the arrangement is now so assembled that with the direction of rotation of the brake wheel corresponding to the unwinding process its braking weights are trailed or dragged along.

Details of the practical configuration of the device are the subject of the dependent claims.

In the following, the invention is described in an exemplary embodiment that is based on as great a gearing ratio as possible with considerable loading of the brake. The drawings show:

FIG. 1 an axial cross section of a cable drum with braking wheel;

FIG. 2 a plan view and an axial section of a braking wheel with resiliently attached centrifugal weights;

FIG. 3 a view of the inside of the base plate facing the drum;

Figure 1:
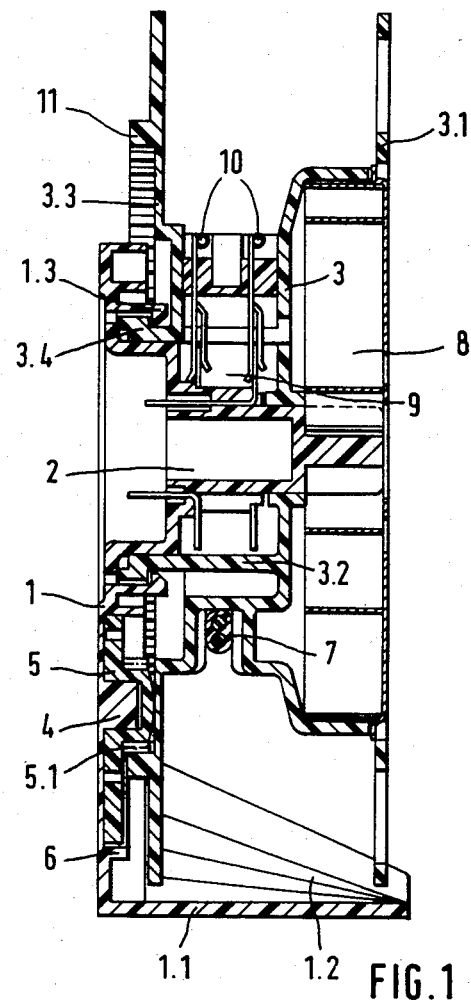
Figure 3:
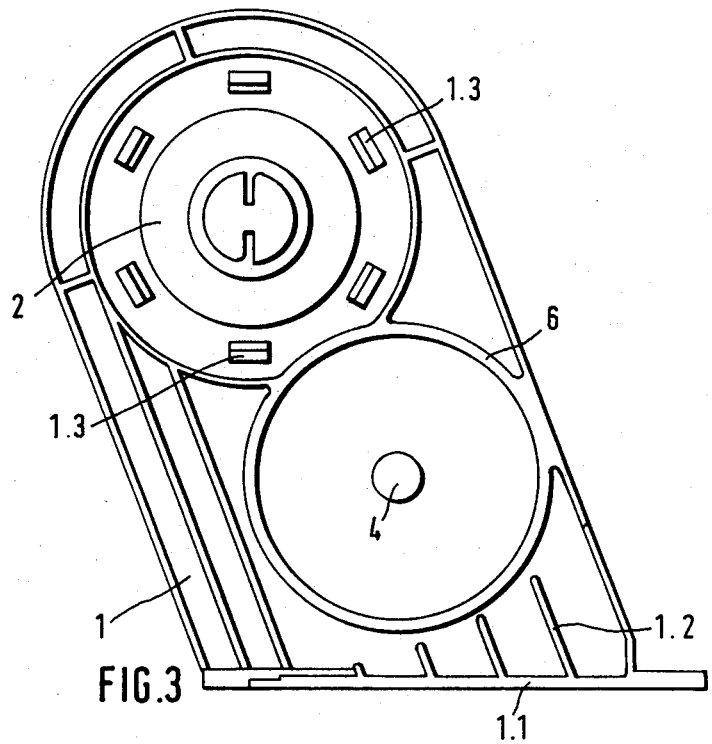

The axial section of FIG. 1 shows an L-formed base plate 1 with a bent foot 1.1, that are reinforced with respect to each other through a plurality of ribs 1.2 (compare FIG. 3). A hollow pivot spindle 2 for a drum 3 and a solid journal pin 4 for a brake wheel 5 as well as a braking collar 6 lying on its perimeter are formed in the base plate 1. The outer drum flange 3.1, with respect to the base plate 1, forms a cup-like depression, in which the coil spring 8 stressed with the unwinding of the cable 7 wound up on the drum is mounted. The two leads of the cable 7 are, through a rotary connection 9 formed out of two sliding contact elements 10 arranged between the drum hub 3.2 and the pivot spindle 2, lead out to the open rear side of the pivot spindle 2 or the base plate 1.

The hub of the brake wheel 5 rotatably supported on the journal pin 4 forms a pinion 5.1 that meshes with a ring gear 11 with internal teeth formed in the rear drum flange 3.3. One appreciates that the ratio of the radii of the pinion 5.1 and the ring gear 11 determines the gearing ratio of the gear drive formed between drum 3 and brake wheel 5.

Figure 2:
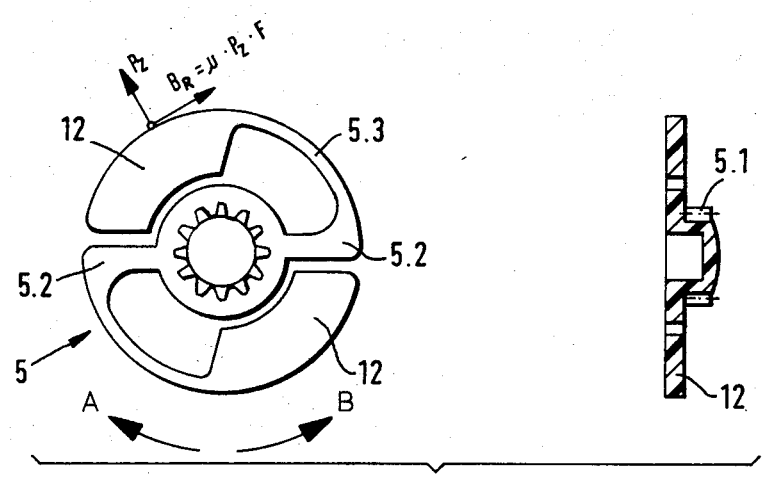

FIG. 2 shows the construction of the brake wheel 5. On its hub forming the pinion 5.1 are formed two stiff radial arms 5.2, standing diametrically opposite with respect to each other, that proceed to resilient arms 5.3 extending lengthwise along the wheel perimeter, on the end of each which rests a centrifugal weight 12. These centrifugal weights extend through the radial surface of brake wheel 5 in a sector of 105° with respect to its hub, with which, however, it has no connection. As a result, the centrifugal weights are pressed outwardly with a quick rotation of the wheel under the centrifugal force action to expand the bent arms 5.3, so that the wheel diameter determined by means of the weights is increased. Thus the weights come to a force locking condition on the brake collar 6.

One appreciates out of the marked up diagram of the centrifugal force D and the braking force $B_R$, that in the rotary direction B, in which the wheel 5 rotates, when the coil spring 8 winds up the cable 7 on the drum 3, the arms 5.3 are stressed in tension and buckled so that a wedging effect occurs enhancing the braking action. Conversely, the arms 5.3, in the rotary direction A are stretched, so that the braking effect diminishes.

FIG. 3 shows an embodiment of the base plate 1, that is only a little wider than the diameter of the braking collar 6 and requires only a small injection mold. The material requirement is correspondingly small. It is understood that the base plate can also be essentially larger and can be part of a housing surrounding the drum 3.

The fabrication of the windup device results through a simple assembly of the parts 1, 5, and 3 in the axial direction of the pivot spindle 2. One appreciates from FIG. 3 in connection with FIG. 1, that the drum 3.2 is secured against a withdrawal from the pivot spindle 2 through a collar 3.4 in its opening and by means of six locking pawls formed in the baseplate 1.

Figure 4:
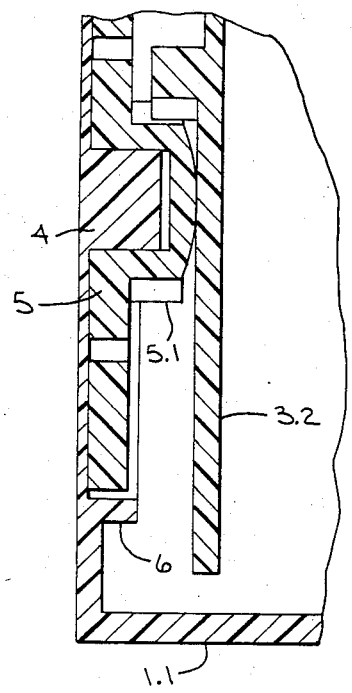
FIG. 4 is a partial cross-sectional view showing a modified form of the gearing arrangement between the drum and the braking wheel.
Figure 5:
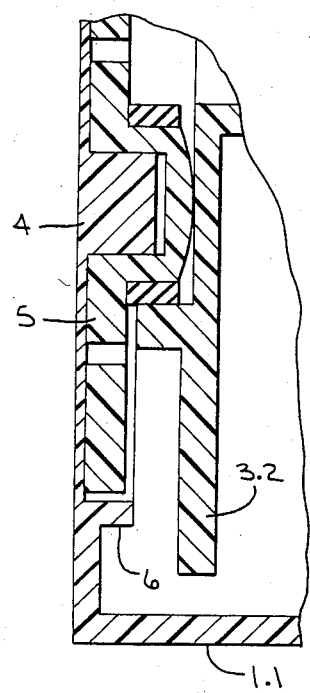
FIG. 5 is a partial cross-sectional view showing a friction drive corresponding generally to the gear drive shown in FIG. 1.
Figure 6:
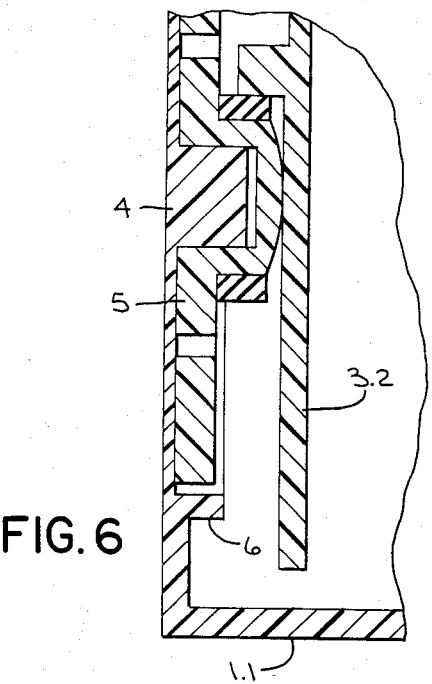
FIG. 6 is a partial cross-sectional view showing a friction drive corresponding generally to the embodiment of FIG. 4.

The invention is not limited to the described exemplary embodiment. Thus the gear ratio that here is approximately 1:8 can also be selected smaller, if the ring gear 11 is arranged on the flange 3.3 between journal pin 4 and pivot spindle 2 and engages with the pinion 5.1 with external gearing (see FIG. 4); the gearing ratio is then approximately 1:5. With yet another configuration of the drum hub 3.2, the ring gear could also form this or could be placed on this. Finally, also friction wheel drives are possible, however these lead nonetheless with the necessary pressures for force connection to increased loading in the bearings. See FIGS. 5 and 6 corresponding generally to FIGS. 1 and 4, respectively.

The brake wheel 5 can be injection molded as a single piece with all elements out of a high strength plastic, for example, Marcolon ® Brand Polycarbonate. The ratio of the braking moment in both directions of rotation A and B can also be influenced through length and thickness of the arms 5.3 through the form of the outer flange of the centrifugal weights 12, however, a blockage of the brake with windup of the cable 7 in direction B must be prevented.

The invention is not limited to the application example of a so-called cable drum described for the illustration but can be used everywhere there are applications in which rotational speed of a shaft or a rotating apparatus with variable torque should not exceed a predetermined value.

I claim:

1. A device for the automatic winding up of a cable comprising:
   a base plate (1) having a pivot spindle (2) and a journal pin (4) spaced from said spindle, said base plate further having a brake collar (6); having a hub rotatably mounted on said pivot spindle; and
   a brake wheel (5) rotatably mounted on said journal pin for engagement, in a speed amplifying manner, with said drum, said brake wheel having centrifugal braking means appliable to said braking collar when said wheel rotates;
   said base plate having a generally planar member with said pivot spindle and journal pin extending from the same side of the planar base plate member so that the device may be assembled by sequentially placing said brake wheel on said journal pin and said drum on said pivot spindle, said pivot spindle and journal pin being so spaced on said base plate member as to place said brake wheel at least partially behind said drum for retaining said brake wheel on said journal pin, said braking collar surrounding said journal pin on said same side of said base plate member, said base plate member having means for retaining said drum, and hence said brake wheel, on said base plate member so as to retain said device in an assembled condition.

2. The device according to claim 1 wherein said brake wheel engages said drum to provide a speed amplification between 1:5 and 1:10.

3. The device according to claim 1 wherein said brake wheel has a hub mounted on said journal pin containing a pinion gear and wherein said drum has a gear engaging with said drum gear for rotating said braking wheel.

4. The device according to claim 3 wherein said gear on said drum is a ring gear having internal teeth and said journal pin lies within said ring gear.

5. The device according to claim 3 wherein said drum has an externally toothed gear and the engagement of said drum and braking wheel occurs at a point between the pivot spindle and journal pin.

6. The device according to claim 1 wherein the engagement between said drum and braking wheel occurs through a friction drive.

7. The device according to claim 1 wherein said brake wheel has a hub mounted on said journal pin, said braking wheel having two centrifugal weight segments connected through resilient arms in a unitary manner to said hub.

8. The device according to claim 1 wherein said base plate is formed as a unitary injection molded part containing said pivot spindle, journal pin, and brake collar.

9. The device according to claim 1 wherein said base plate is formed as a L-shaped angled element having a longer leg and a shorter leg, said longer leg forming said generally planar member carrying said pivot spindle, journal pin, and braking collar on the same side thereof, said pivot spindle and journal pin extending from said longer leg generally normal thereto, and said shorter leg being formed as a supporting foot for said base plate, said shorter leg extending from said longer leg generally parallel to said pivot spindle and having generally the same length, in extension, as said pivot spindle.

* * * * *

UNITED STATES PATENT AND TRADEMARK OFFICE
CERTIFICATE OF CORRECTION

PATENT NO. : 4,500,048
DATED : February 19, 1985
INVENTOR(S) : Albert R. Schaller It is certified that error appears in the above-identified patent and that said Letters Patent is hereby corrected as shown below:

Column 3, Line 25, delete "D" and substitute therefor ---$P_2$---

Column 4, Line 10, after "(6);" and before "having", inset, as a new paragraph "a drum (3) around which the cable is wrapped, said drum"

Signed and Sealed this

Fifteenth Day of April 1986

[SEAL]

Attest:

DONALD J. QUIGG

Attesting Officer

Commissioner of Patents and Trademarks